T. J. CHANDONNET.
LIFTING MECHANISM FOR GANG PLOWS.
APPLICATION FILED JULY 21, 1911.
1,013,740.
Patented Jan. 2, 1912.
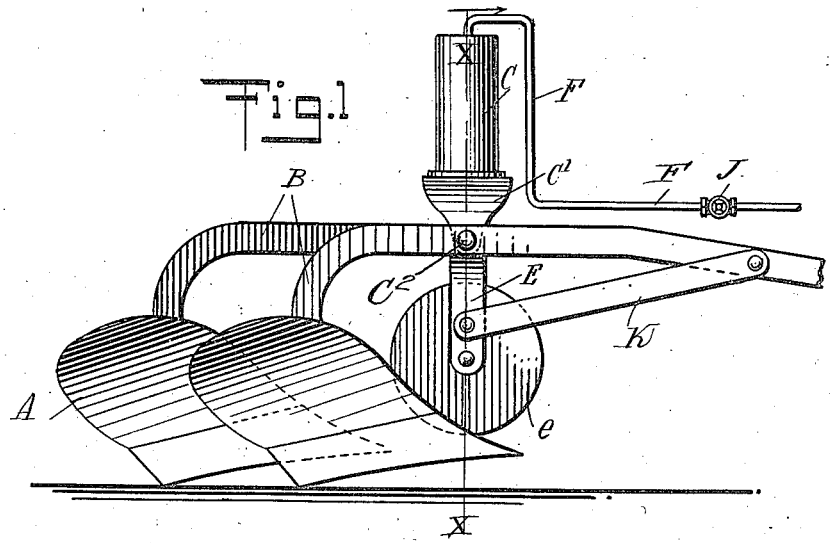
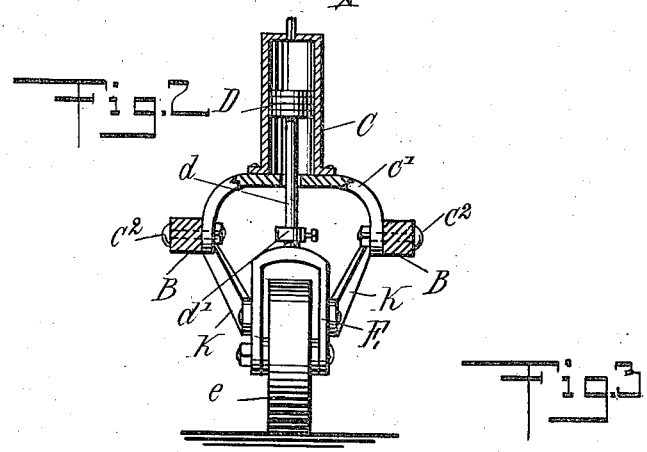
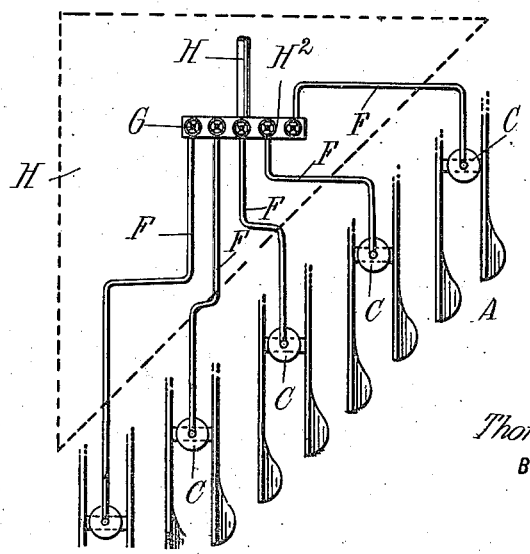
WITNESSES
INVENTOR
Thomas J. Chandonnet
BY
ATTORNEYS

UNITED STATES PATENT OFFICE.

THOMAS J. CHANDONNET, OF WAUBUN, MINNESOTA.

LIFTING MECHANISM FOR GANG-PLOWS.

1,013,740.  Specification of Letters Patent.  Patented Jan. 2, 1912.

Application filed July 21, 1911. Serial No. 639,733.

*To all whom it may concern:*

Be it known that I, THOMAS J. CHANDONNET, a citizen of the United States, and a resident of Waubun, in the county of Mahnomen and State of Minnesota, have invented a new and Improved Lifting Mechanism for Gang-Plows, of which the following is a full, clear, and exact description.

The object of the present invention is to provide a gang-plow with a lifting apparatus operated by a fluid pressure cylinder mounted upon the frame of the plow, or of a pair of plows in a gang of plows, so that a particular plow, or pair of plows may be raised at any time independently of other plows in the gang of plows; and to enable the operator to finish the plowing of the field on a straight line, or substantially straight line; and to permit the plows to, independently of each other, rise and fall as they pass over uneven ground.

Reference is to be had to the accompanying drawings forming a part of this specification, in which similar characters of reference indicate corresponding parts in all the views, and in which—

Figure 1 shows in side elevation a pair of plows provided with the improved lifting device; Fig. 2 shows a vertical sectional view on the line $x$—$x$ in Fig. 1, looking in the direction of the arrow in that view; and Fig. 3 is a diagrammatic view illustrating the arrangement of piping where a gang of ten plows are arranged in pairs, each pair provided with a lifter.

The plows A and their frames B may be of any usual or preferred construction, and as illustrated in the drawings, they may be arranged in pairs, one slightly in advance of the other, so that, as shown in Fig. 3, a gang of such plows may be arranged on an oblique line, those at one end operating in advance of those at the other. The lifting device comprises a fluid pressure cylinder C mounted upon a yoke C', which yoke is pivoted by means of bolts $C^2$ to the frames B of a pair of plows. Within the cylinder C is a piston D, at the upper end of a piston rod $d$. The lower end of the piston rod $d$ carries a yoke E in which is mounted to revolve freely, a wheel $e$. The movement of the piston within the cylinder positions the wheel $e$ with relation to the working lower ends of the plows A. If the said wheel is forced downward against the surface of the earth and below the working ends of the plows, the result is that the plows will be withdrawn from, and elevated above the ground, and also the position of the wheel with relation to the working end of the plows determines the depth to which the plows may enter the ground. To limit the upward movement of the wheel, and thus regulate the depth to which the plows may enter the ground, the piston rod $d$ is provided with an adjustable collar $d'$ which may be placed at varying points along the piston rod, as required. The piston is acted upon by steam or compressed air, which is conducted thereto through a pipe F, and which leads into the upper end of the cylinder, as shown clearly in Figs. 1 and 2 of the drawings.

Referring to Fig. 3 of the drawings, the triangular dotted line H represents the frame of the gang which will carry a suitable source of supply of compressed air or steam. The main conductor pipe H' leads from the source of supply to a cross pipe $H^2$ from which are conducted the pipes F, preferably rubber or flexible hose leading to metal pipes F' connected to the cylinder C. Each of the pipes F will be controlled by a valve J, preferably a three-way valve, so that each cylinder may be charged with compressed air or steam or emptied into the atmosphere, independently of the others, and thus each pair of plows is raised or lowered independently of other pairs in the gang of plows. The yoke E supporting the wheel $e$ will be strengthened and braced by means of links K, which at one end will be connected to the yoke E, and at the other to the frame B of the plow.

It is important to note that by placing the lifting means upon the plow itself, the plow is permitted to rise and fall to conform to the unevenness of surface of the field, at the same time being independent of other plows in the gang of plows, which would not be the result if the lifting apparatus were mounted on the frame of the gang of plows.

Having thus described my invention, I claim as new and desire to secure by Letters Patent:

1. A plow, a supporting and gaging wheel, and a fluid pressure apparatus mounted on the frame of the plow for positioning the wheel with relation to the working end of the plow.

2. A gang plow comprising a plurality of plows, a fluid pressure lifting device mounted on the plows, and means for operating said device to lift the plows independently of each other.

3. A gang plow, comprising a plurality of plows arranged in pairs, each pair carrying a fluid pressure lifting device, a main conductor for conducting fluid under pressure from the frame of the gang of plows to the lifting devices, and means for controlling the fluid pressure supply of a pair of plows independent of adjacent pairs of plows.

In testimony whereof I have signed my name to this specification in the presence of two subscribing witnesses.

THOMAS J. CHANDONNET.

Witnesses:
D. E. KANE,
CHAS. A. MAGNUSSON.